United States Patent
Kono et al.

(10) Patent No.: US 9,035,495 B2
(45) Date of Patent: May 19, 2015

(54) ANALYSIS DEVICE OF CATENARY-BASED TRANSPORTATION SYSTEM, ANALYSIS METHOD AND PROGRAM THEREFOR

(75) Inventors: Takayuki Kono, Tokyo (JP); Katsuaki Morita, Tokyo (JP); Kazuki Ozaki, Tokyo (JP); Yasunari Nagaki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 337 days.

(21) Appl. No.: 13/805,381

(22) PCT Filed: Feb. 13, 2012

(86) PCT No.: PCT/JP2012/053261
§ 371 (c)(1),
(2), (4) Date: Dec. 19, 2012

(87) PCT Pub. No.: WO2012/111607
PCT Pub. Date: Aug. 23, 2012

(65) Prior Publication Data
US 2013/0088085 A1    Apr. 11, 2013

(30) Foreign Application Priority Data
Feb. 18, 2011    (JP) .................................. 2011-033501

(51) Int. Cl.
*H02J 4/00* (2006.01)
*B60M 3/06* (2006.01)

(52) U.S. Cl.
CPC ... *H02J 4/00* (2013.01); *B60M 3/06* (2013.01)

(58) Field of Classification Search
CPC .................. H02J 3/00; H02J 4/00; B60L 7/10; B60L 11/18; B60M 3/06; B60M 3/02
See application file for complete search history.

(56) References Cited

U.S. PATENT DOCUMENTS

| | | | |
|---|---|---|---|
| 5,382,834 A | * | 1/1995 | Young .............................. 307/9.1 |
| 2007/0278059 A1 | * | 12/2007 | Afriat .......................... 191/29 R |

(Continued)

FOREIGN PATENT DOCUMENTS

| | | |
|---|---|---|
| CN | 1639943 | 7/2005 |
| CN | 101682195 | 3/2010 |

(Continued)

OTHER PUBLICATIONS

Chinese Office Action issued Aug. 22, 2014 in corresponding Chinese Patent Application No. 201280001908.3 with partial English translation.

(Continued)

*Primary Examiner* — Jared Fureman
*Assistant Examiner* — Terrence Willoughby
(74) *Attorney, Agent, or Firm* — Wenderoth, Lind & Ponack, L.L.P.

(57) ABSTRACT

In a catenary-based transportation system which is provided with integrated power supply equipment having an electricity storage unit which stores electricity regenerated by vehicles traveling by electricity received from a catenary and supplies electricity to the catenary and the other power supply system which is a power supply system different from the electricity storage unit concerned, the performance of a rectifier of the other power supply system is determined based on a power-supplying contribution ratio γ of the other power supply system so that the cost value of the integrated power supply equipment becomes lower than a target cost value.

6 Claims, 7 Drawing Sheets

(56) References Cited

U.S. PATENT DOCUMENTS

| | | | |
|---|---|---|---|
| 2010/0300780 A1* | 12/2010 | Caruso et al. | 180/65.21 |
| 2012/0019058 A1* | 1/2012 | Goodermuth et al. | 307/9.1 |
| 2013/0110338 A1 | 5/2013 | Takao et al. | |

FOREIGN PATENT DOCUMENTS

| | | |
|---|---|---|
| JP | 2006-254536 | 9/2006 |
| JP | 2008-024206 | 2/2008 |
| JP | 2009-067205 | 4/2009 |
| JP | 2010-193545 | 9/2010 |
| KR | 10-2009-0123770 | 12/2009 |
| WO | 2012/015042 | 2/2012 |

OTHER PUBLICATIONS

Korean Notice of Allowance issued Feb. 13, 2014 in corresponding Korean Patent Application No. 10-2012-7033423 with English translation.

International Search Report issued Mar. 13, 2012 in International (PCT) Application No. PCT/JP2012/053261 with English translation.

Written Opinion of the International Searching Authority issued Mar. 13, 2012 in International (PCT) Application No. PCT/JP2012/053261 with English translation.

* cited by examiner

US 9,035,495 B2

ANALYSIS DEVICE OF CATENARY-BASED TRANSPORTATION SYSTEM, ANALYSIS METHOD AND PROGRAM THEREFOR

TECHNICAL FIELD

The present invention relates to an analysis device which analyzes configuration conditions of power supply equipment provided in a catenary-based transportation system, an analysis method and a program therefor.

Priority is claimed on Japanese Patent Application No. 2011-033501, filed Feb. 18, 2011, the content of which is incorporated herein by reference.

BACKGROUND ART

In a catenary-based transportation system where vehicles (electric trains, etc.) travel by means of electricity received from a catenary, it is required that a voltage be equalized in view of electricity costs, irrespective of where the catenary is placed.

Patent Document 1 discloses technologies for suppressing variations in voltages because there are many sites, especially those distant from an electric power substation, that undergo a drastic change in catenary voltage.

PRIOR ART DOCUMENTS

Patent Documents

Patent Document 1: Japanese Published Unexamined Patent Application No.

SUMMARY OF INVENTION

Problem to be Solved by the Invention

Here, in the technologies of disclosed in the Patent Document above, it is required to appropriately determine configurations which will affect the cost of the power supply equipment (for example, the number of electricity storage devices arrayed in parallel inside an electricity storage unit which stores electricity regenerated by vehicles traveling by electricity received from a catenary and the performance of a rectifier in an electric power substation) so as to be lower than a target cost of the power supply equipment, of power supply equipment provided in a catenary-based transportation system.

Therefore, an object of this invention is to provide an analysis device of a catenary-based transportation system which is capable of solving the above-described problem, an analysis method, and a program therefor.

Means for Solving the Problem

In order to attain the above object, the present invention is an analysis device of a catenary-based transportation system which is provided with integrated power supply equipment having an electricity storage unit which stores electricity regenerated by vehicles traveling by electricity received from a catenary and also supplies electricity to the catenary and another power supply system which is a power supply system different from the electricity storage unit, the analysis device which includes a first minimum parallel-array number-calculating portion in which based on maximum input electricity input to the electricity storage unit and allowable input electricity which is allowed by a single serial-array system of electricity storage devices which configure the electricity storage unit in the catenary-based transportation system, a minimum integer greater than a proportion of the maximum input electricity to the allowable input electricity is calculated as a first minimum parallel-array number of the electricity storage devices which configure the electricity storage unit; a second minimum parallel-array number-calculating portion in which a minimum integer which satisfies such conditions that a sum of the amount of reduced electric energy of the electricity storage unit during a predetermined time period highest in operation frequency of the vehicles in the catenary-based transportation system and charged capacity accumulated in the electricity storage unit based on electricity regenerated during the predetermined time period is in excess of discharged capacity of the electricity storage unit in the case of a power-supplying contribution ratio γ of the other power supply system in a total discharged capacity of the integrated power supply equipment is calculated as a second minimum parallel-array number of the electricity storage devices which configure the electricity storage unit; a portion for specifying the number of electricity storage devices arrayed in parallel in which a greater value obtained by comparing the first minimum parallel-array number with the second minimum parallel-array number is specified as a first necessary parallel-array number of electricity storage devices which configure the electricity storage unit; and a power equipment configuration conditions-specifying portion in which a determination is made as to whether or not a cost value of power supply equipment which is composed of the cost of the other power supply system in the case of the power-supplying contribution ratio γ and the cost of the electricity storage unit configured by the first necessary parallel-array number of electricity storage devices is equal to or less than a previously-stored target cost value, where the cost value of power supply equipment is equal to or less than the target cost value, the power-supplying contribution ratio γ and the first necessary parallel-array number are output as configuration conditions of the integrated power supply equipment, and where the cost value of power supply equipment is in excess of the target cost value, the cost value of power supply equipment is calculated by changing the power-supplying contribution ratio γ until the cost value of power supply equipment becomes equal to or less than the target cost value.

Further, according to the present invention, the catenary-based transportation system may further include a storage power supply equipment which includes an electricity storage unit connected to a site different from a position at which the other power supply system is connected to a catenary. The analysis device may further include a third minimum parallel-array number-calculating portion in which based on maximum output electricity output from the electricity storage unit of the storage power supply equipment and allowable output electricity which is allowed by a single serial-array system of electricity storage devices which configure the electricity storage unit of the storage power supply equipment, a minimum integer greater than a proportion of the maximum output electricity to the allowable output electricity is calculated as a third minimum parallel-array number of electricity storage devices which configure the electricity storage unit of the storage power supply equipment; and a fourth minimum parallel-array number-calculating portion in which a minimum integer which satisfies such conditions that a sum of the amount of reduced electric energy of the electricity storage unit of the storage power supply equipment during a predetermined time period highest in operation frequency of the vehicles in the catenary-based transportation system and charged capacity accumulated in the electricity storage unit of the storage power supply equipment based on electricity regenerated during the predetermined time period is in excess of discharged capacity of the storage power supply equipment is calculated as a fourth minimum parallel-array number of electricity storage devices which configure the electricity storage unit of the storage power supply equipment. The portion for specifying the number of electricity storage devices arrayed in parallel compares the third minimum parallel-array number with the fourth minimum parallel-array number and specifies a greater value as a second necessary parallel-array number of electricity storage devices which configure the electricity storage unit of the storage power supply equipment. The power equipment configuration conditions-specifying portion determines whether or not a total cost value of power supply equipment which is composed of the cost of the other power supply system in the case of the power-supplying contribution ratio $\gamma$, the cost of the electricity storage unit of the integrated power supply equipment which is configured by the first necessary parallel-array number of electricity storage devices, and the cost of the storage power supply equipment having the electricity storage unit which is configured by the second necessary parallel-array number of electricity storage devices is equal to or less than a previously-stored target cost value. The power equipment configuration conditions-specifying portion outputs the power-supplying contribution ratio $\gamma$ and the first necessary parallel-array number as configuration conditions of the integrated power supply equipment and also outputs the second necessary parallel-array number as configuration conditions of the storage power supply equipment, where the total cost value of power supply equipment is equal to or less than the target cost value. The power equipment configuration conditions-specifying portion calculates the total cost value of power supply equipment by changing the power-supplying contribution ratio $\gamma$ until the total cost value of power supply equipment becomes equal to or less than the target cost value, where the total cost value of power supply equipment is in excess of the target cost value.

Further, the present invention is an analysis method by an analysis device of a catenary-based transportation system which is provided with integrated power supply equipment having an electricity storage unit which stores electricity regenerated from vehicles traveling by electricity received from a catenary and also supplies electricity to the catenary and the other power supply system which is a power supply system different from the electricity storage unit concerned, the analysis method which includes calculating a minimum integer greater than a proportion of maximum input electricity to allowable input electricity as a first minimum parallel-array number of the electricity storage devices which configure the electricity storage unit based on the maximum input electricity input to the electricity storage unit and the allowable input electricity which is allowed by a single serial-array system of electricity storage devices which configure the electricity storage unit in the catenary-based transportation system; calculating a minimum integer as a second minimum parallel-array number of the electricity storage devices which configure the electricity storage unit, the minimum integer satisfying such conditions that a sum of the amount of reduced electric energy of the electricity storage unit during a predetermined time period highest in operation frequency of the vehicles in the catenary-based transportation system and charged capacity accumulated in the electricity storage unit based on electricity regenerated during the predetermined time period is in excess of discharged capacity of the electricity storage unit in the case of a power-supplying contribution ratio $\gamma$ of the other power supply system in a total discharged capacity of the integrated power supply equipment; specifying a greater value obtained by comparing the first minimum parallel-array number with the second minimum parallel-array number as a first necessary parallel-array number of electricity storage devices which configure the electricity storage unit; determining whether or not a cost value of power supply equipment which is composed of the cost of the other power supply system in the case of the power-supplying contribution ratio $\gamma$ and the cost of the electricity storage unit which is configured by the first necessary parallel-array number of electricity storage devices is equal to or less than a previously-stored target cost value; outputting the power-supplying contribution ratio $\gamma$ and the first necessary parallel-array number as configuration conditions of the integrated power supply equipment in the case where the cost value of power supply equipment is equal to or less than the target cost value; and calculating the cost value of the power supply equipment is calculated by changing the power-supplying contribution ratio $\gamma$ until the cost value of power supply equipment becomes equal to or less than the target cost value in the case where the cost value of power supply equipment is in excess of the target cost value.

Further, the present invention is the analysis method of the catenary-based transportation system which further includes a storage power supply equipment which includes an electricity storage unit connected to a site different from a position at which the other power supply system is connected to a catenary, and the analysis method may further include calculating a minimum integer greater than a proportion of maximum output electricity to allowable output electricity as a third minimum parallel-array number of electricity storage devices which configure the electricity storage unit of the storage power supply equipment based on the maximum output electricity output from the electricity storage unit of the storage power supply equipment and the allowable output electricity which is allowed by a single serial-array system of electricity storage devices which configure the electricity storage unit of the storage power supply equipment; calculating a minimum integer as a fourth minimum parallel-array number of electricity storage devices which configure the electricity storage unit of the storage power supply equipment, the minimum integer satisfying such conditions that a sum of the amount of reduced electric energy of the electricity storage unit of the storage power supply equipment during a predetermined time period highest in operation frequency of the vehicles in the catenary-based transportation system and charged capacity accumulated in the electricity storage unit of the storage power supply equipment based on electricity regenerated during the predetermined time period is in excess of discharged capacity of the storage power supply equipment; specifying a greater value obtained by comparing the third minimum parallel-array number with the fourth minimum parallel-array number as a second necessary parallel-array number of electricity storage devices which configure the electricity storage unit of the storage power supply equipment; determining whether or not a total cost value of power supply equipment which is composed of the cost of the other power supply system in the case of the power-supplying contribution ratio $\gamma$, the cost of the electricity storage unit of the integrated power supply equipment which is configured by the first necessary parallel-array number of electricity storage devices, and the cost of the storage power supply equipment having the electricity storage unit configured by the second necessary parallel-array number of electricity storage devices is equal to or less than a previously-stored target cost value; outputting the power-supplying contribution ratio $\gamma$ and the first necessary parallel-array number as configuration conditions of the integrated power supply equipment and also the second necessary parallel-array number as configuration conditions of the storage power supply equipment in the case where the total cost value of power supply equipment is equal to or less than the target cost value; and calculating the total cost value of power supply equipment by changing the power-supplying contribution ratio γ until the total cost value of power supply equipment becomes equal to or less than the target cost value in the case where the total cost value of power supply equipment is in excess of the target cost value.

Still further, the present invention is a program for causing a computer of an analysis device of a catenary-based transportation system which is provided with integrated power supply equipment having an electricity storage unit which stores electricity regenerated by vehicles traveling by electricity received from a catenary and supplies electricity to the catenary and the other power supply system which is a power supply system different from the electricity storage unit, to perform as first minimum parallel-array number-calculating means which calculates a minimum integer greater than a proportion of a maximum input electricity to an allowable input electricity as a first minimum parallel-array number of the electricity storage devices which configure the electricity storage unit based on the maximum input electricity input to the electricity storage unit in the catenary-based transportation system and the allowable input electricity which is allowed by a single serial-array system of electricity storage devices which configure the electricity storage unit; second minimum parallel-array number-calculating means which calculates a minimum integer as a second minimum parallel-array number of the electricity storage devices which configure the electricity storage unit, the minimum integer satisfying such conditions that a sum of the amount of reduced electric energy of the electricity storage unit during a predetermined time period highest in operation frequency of the vehicles in the catenary-based transportation system and charged capacity accumulated in the electricity storage unit based on electricity regenerated during the predetermined time period is in excess of discharged capacity of the electricity storage unit in the case of a power-supplying contribution ratio γ of the other power supply system in a total discharged capacity of the integrated power supply equipment; means for specifying the number of electricity storage devices arrayed in parallel which specifying a greater value obtained by comparing the first minimum parallel-array number with the second minimum parallel-array number as a first necessary parallel-array number of electricity storage devices which configure the electricity storage unit; and power equipment configuration conditions specifying means which determines whether or not a cost value of power supply equipment which is composed of the cost of the other power supply system in the case of the power-supplying contribution ratio γ and the cost of the electricity storage unit configured by the first necessary parallel-array number of electricity storage devices is equal to or less than a previously-stored target cost value, the power equipment configuration conditions specifying means outputting the power-supplying contribution ratio γ and the first necessary parallel-array number as configuration conditions of the integrated power supply equipment in the case where the cost value of power supply equipment is equal to or less than the target cost value, and the power equipment configuration conditions calculating the cost value of power supply equipment by changing the power-supplying contribution ratio γ until the cost value of power supply equipment becomes equal to or less than the target cost value in the case where the cost value of power supply equipment is in excess of the target cost value.

In addition, the present invention may be the program for causing the computer of the analysis device of the catenary-based transportation system which further includes a storage power supply equipment which includes an electricity storage unit connected to a site different from a position at which the other power supply system is connected to a catenary, to perform as third minimum parallel-array number-calculating means calculates a minimum integer greater than a proportion of maximum output electricity to allowable output electricity as a third minimum parallel-array number of electricity storage devices which configure the electricity storage unit of the storage power supply equipment based on the maximum output electricity output from the electricity storage unit of the storage power supply equipment and allowable output electricity which is allowed by a single serial-array system of electricity storage devices which configure the electricity storage unit of the storage power supply equipment; and fourth minimum parallel-array number-calculating means which calculates a minimum integer as a fourth minimum parallel-array number of electricity storage devices which configure the electricity storage unit of the storage power supply equipment, the minimum integer satisfying such conditions that a sum of the amount of reduced electric energy of the electricity storage unit of the storage power supply equipment during a predetermined time period highest in operation frequency of the vehicles in the catenary-based transportation system and charged capacity accumulated in the electricity storage unit of the storage power supply equipment based on electricity regenerated during the predetermined time period is in excess of discharged capacity of the storage power supply equipment. The means for specifying the number of electricity storage devices arrayed in parallel compares the third minimum parallel-array number with the fourth minimum parallel-array number and specifies a greater value as a second necessary parallel-array number of electricity storage devices which configure the electricity storage unit of the storage power supply equipment. The power equipment configuration conditions specifying means determines whether or not a total cost value of power supply equipment which is composed of the cost of the other power supply system in the case of the power-supplying contribution ratio γ, the cost of the electricity storage unit of the integrated power supply equipment which is configured by the first necessary parallel-array number of electricity storage devices, and the cost of the storage power supply equipment having the electricity storage unit configured by the second necessary parallel-array number of electricity storage devices is equal to or less than a previously-stored target cost value, outputs the power-supplying contribution ratio γ and the first necessary parallel-array number as configuration conditions of the integrated power supply equipment and also outputs the second necessary parallel-array number as configuration conditions of the storage power supply equipment in the case where the total cost value of power supply equipment is equal to or less than the target cost value. The power equipment configuration conditions specifying means calculates the total cost value of power supply equipment by changing the power-supplying contribution ratio γ until the total cost value of power supply equipment becomes equal to or less than the target cost value in the case where the total cost value of power supply equipment is in excess of the target cost value.

Effect of Invention

According to the present invention, it is possible to appropriately determine the configuration conditions of power supply equipment which is provided in a catenary-based transportation system so as to be equal to or less than a target cost of the power supply equipment concerned.

DESCRIPTION OF EMBODIMENTS

Hereinafter, a description will be given of an analysis device of a catenary-based transportation system according to the embodiments of the present invention with reference to the drawings.

Figure 1:
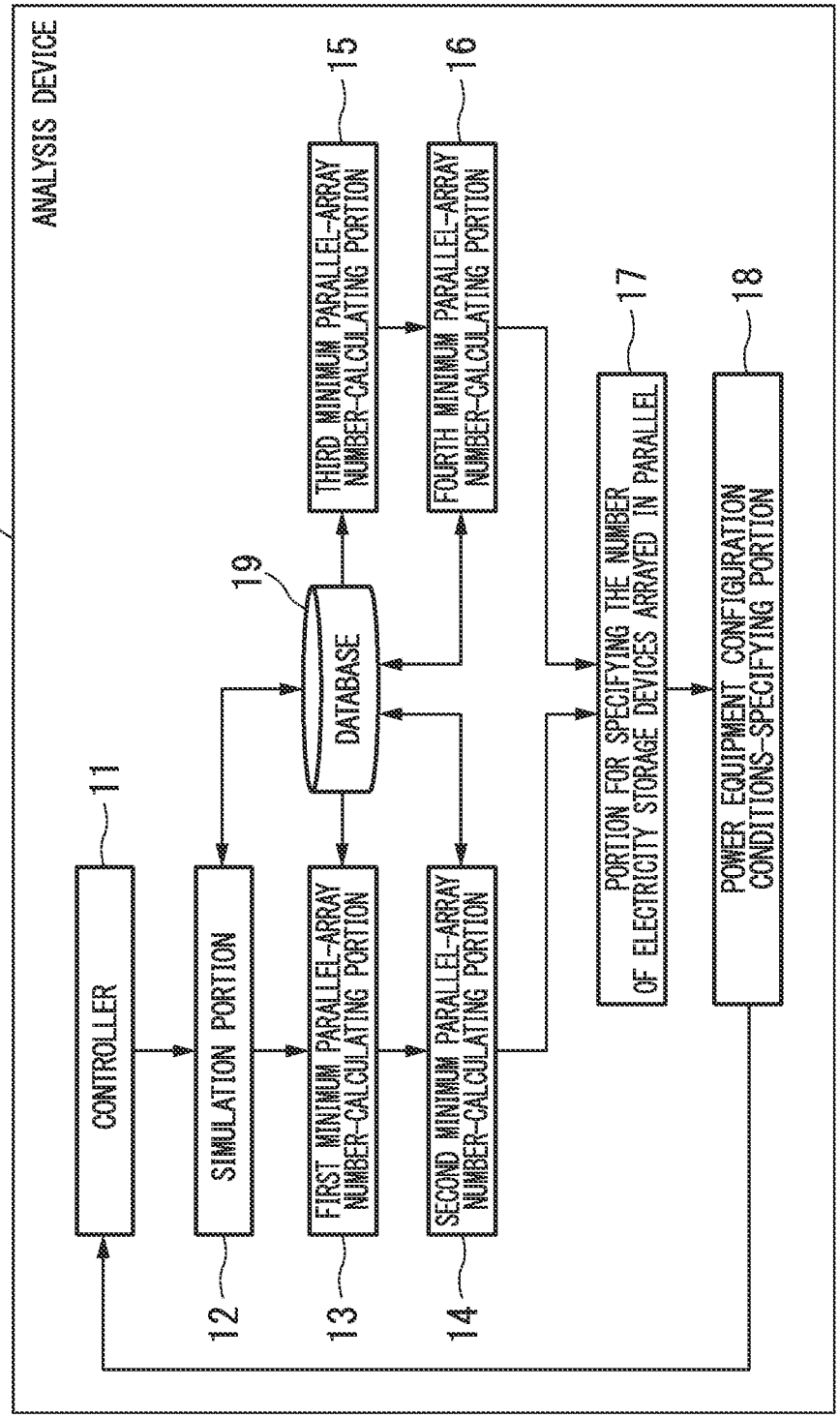
FIG. 1 is a block diagram which shows a configuration of an analysis device.

FIG. 1 is a block diagram which shows a configuration of the analysis device.

Figure 2A:
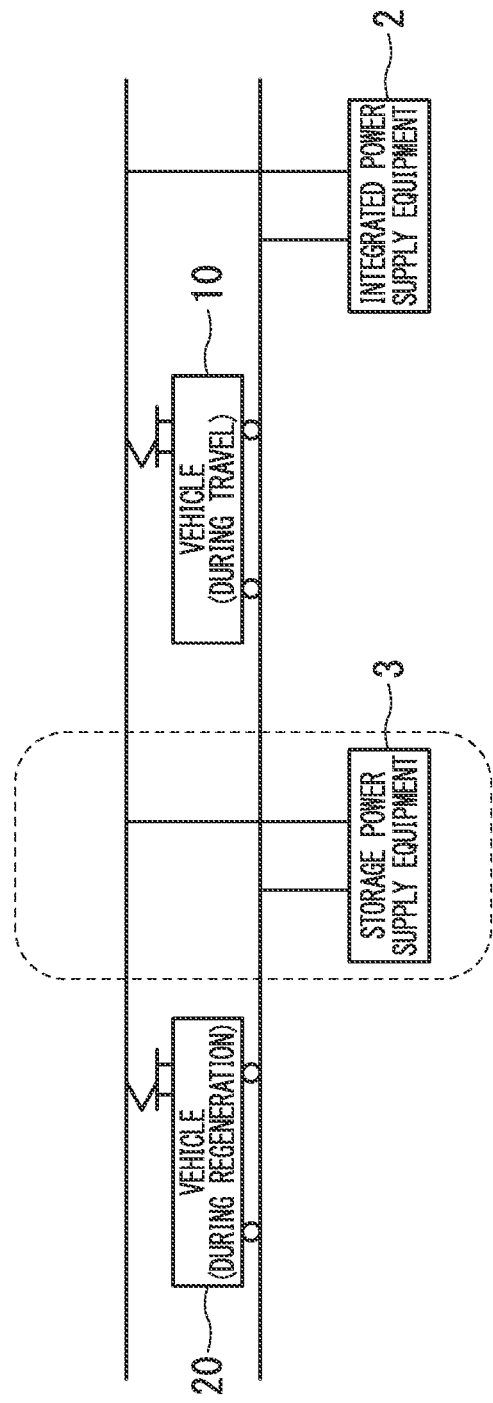
FIG. 2A is a schematic diagram which shows a catenary-based transportation system to be analyzed by the analysis device.
Figure 2B:
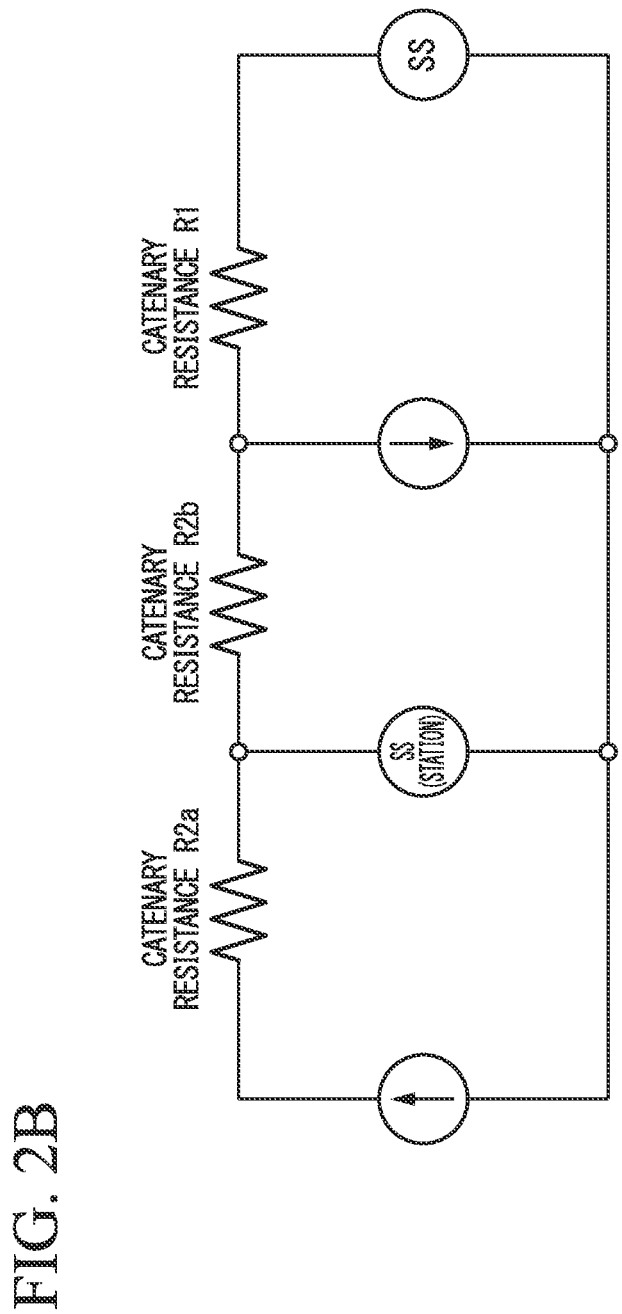
FIG. 2B is a schematic diagram which shows a catenary-based transportation system to be analyzed by the analysis device.

Each of FIG. 2A and FIG. 2B is a schematic diagram which shows a catenary-based transportation system to be analyzed by the analysis device.

In FIG. 1, the reference numeral 1 denotes the analysis device of the catenary-based transportation system. Then, as shown in FIG. 1, the analysis device 1 is provided with individual processing portions and storage portions such as a controller 11, a simulation portion 12, a first minimum parallel-array number-calculating portion 13, a second minimum parallel-array number-calculating portion 14, a third minimum parallel-array number-calculating portion 15, a fourth minimum parallel-array number-calculating portion 16, a portion of specifying the number of electricity storage devices arrayed in parallel 17, a power equipment configuration conditions-specifying portion 18, and a database 19.

As shown in FIG. 2A, the catenary-based transportation system to be analyzed by the analysis device 1 is provided with integrated power supply equipment 2. The catenary-based transportation system may be provided with storage power supply equipment 3. The integrated power supply equipment 2 is power supply equipment which includes an electricity storage unit which stores electricity regenerated by vehicles traveling by electricity from a catenary and another power supply system which is a power supply system other than the electricity storage unit (for example, a power system which supplies power obtained from a power company after transformation and rectification).

The storage power supply equipment 3 is power supply equipment which includes an electricity storage unit which is connected to a site (near a station and the like) different from a site at which the integrated power supply equipment 2 is connected to a catenary.

The controller 11 carries out an analysis program, thereby controlling individual processing portions which are functional configurations installed on the analysis device 1.

The simulation portion 12 is a processing portion which calculates average electricity, maximum output electricity, maximum input electricity and the like at a catenary point specified on the catenary-based transportation system (for example, calculation of maximum input electricity flowing into an electricity storage unit for storing electricity regenerated by vehicles traveling by electricity received from a catenary).

The first minimum parallel-array number-calculating portion 13 is a processing portion in which based on maximum input electricity input to the electricity storage unit provided in the integrated power supply equipment 2 of the catenary-based transportation system and allowable input electricity which is allowed by a single serial-array system of electricity storage devices which configure the electricity storage unit of the integrated power supply equipment 2, a minimum integer greater than a proportion of the maximum input electricity to the allowable input electricity is calculated as a first minimum parallel-array number of electricity storage devices which configure the electricity storage unit of the integrated power supply equipment 2.

The second minimum parallel-array number-calculating portion 14 is a processing portion in which a minimum integer which satisfies such conditions that a sum of the amount of reduced electric energy of the electricity storage unit of the integrated power supply equipment 2 during a predetermined time period highest in operation frequency of vehicles in the catenary-based transportation system (for example, a time period from the start of commuter rush hour to the end of commuter rush hour) and charged capacity accumulated in the electricity storage unit of the integrated power supply equipment 2 based on electricity regenerated during the predetermined time period is in excess of discharged capacity of the electricity storage unit of the integrated power supply equipment 2 in the case of a power-supplying contribution ratio $\gamma$ of the other power supply system in a total discharged capacity of the integrated power supply equipment 2 is calculated as a second minimum parallel-array number of electricity storage devices which configure the electricity storage unit of the integrated power supply equipment 2.

The third minimum parallel-array number-calculating portion 15 and the fourth minimum parallel-array number-calculating portion 16 are processing portions which carry out processing in the case that a catenary-based transportation system is additionally provided with the storage power supply equipment 3 which includes an electricity storage unit connected to a site different from a site at which the integrated power supply equipment 2 is connected to a catenary.

Then, the third minimum parallel-array number-calculating portion 15 is a processing portion in which based on maximum output electricity output from the electricity storage unit of the storage power supply equipment 3 and allowable output electricity which is allowed by a single serial-array system of electricity storage devices which configure the electricity storage unit of the storage power supply equipment 3, a minimum integer greater than a proportion of the maximum output electricity to the allowable output electricity is calculated as a third minimum parallel-array number of electricity storage devices which configure the electricity storage unit of the storage power supply equipment 3.

Further, the fourth minimum parallel-array number-calculating portion 16 is a processing portion in which a minimum integer which satisfies such conditions that a sum of the amount of reduced electric energy of the electricity storage unit inside the storage power supply equipment 3 during a predetermined time period highest in operation frequency of vehicles in the catenary-based transportation system and charged capacity accumulated in the electricity storage unit inside the storage power supply equipment 3 based on electricity regenerated during the predetermined time period is in excess of discharged capacity of the storage power supply equipment 3 is calculated as a fourth minimum parallel-array number of electricity storage devices which configure the electricity storage unit of the storage power supply equipment 3.

Further, the portion for specifying the number of electricity storage devices arrayed in parallel 17 is a processing portion in which where a catenary system is provided with the integrated power supply equipment 2, a greater value obtained by comparing the first minimum parallel-array number with the second minimum parallel-array number is specified as a first necessary parallel-array number of electricity storage devices which configure the electricity storage unit inside the integrated power supply equipment 2.

The portion for specifying the number of electricity storage devices arrayed in parallel 17 is also a processing portion in which where the catenary system is additionally provided with the storage power supply equipment 3, a greater value obtained by comparing the third minimum parallel-array number with the fourth minimum parallel-array number is specified as a second necessary parallel-array number of electricity storage devices which configure the electricity storage unit inside the storage power supply equipment 3.

Still further, the power equipment configuration conditions-specifying portion 18 is a processing portion in which where the catenary system is provided with the integrated power supply equipment 2, a determination is made as to whether or not a cost value of power supply equipment which is composed of the cost of the other power supply system in the case of a power-supplying contribution ratio $\gamma$ and the cost of the electricity storage unit inside the integrated power supply equipment 2 which is configured by the first necessary parallel-array number of electricity storage devices is equal to or less than a previously-stored target cost value, where the cost value of power supply equipment is equal to or less than the target cost value, the power-supplying contribution ratio $\gamma$ and the first necessary parallel-array number are output as configuration conditions of the integrated power supply equipment 2, and where the cost value of power supply equipment is in excess of the target cost value, the cost value of power supply equipment at the time when the power-supplying contribution ratio $\gamma$ has been changed is calculated until the cost value of power supply equipment becomes equal to or less than the target cost value.

In addition, the power equipment configuration conditions-specifying portion 18, is a portion in which where the catenary system is also provided with the storage power supply equipment 3 besides the integrated power supply equipment 2, a determination is made as to whether or not a total cost value of power supply equipment which is composed of the cost of the other power supply system in the case of the power-supplying contribution ratio $\gamma$, the cost of the electricity storage unit of the integrated power supply equipment 2 which is configured by the first necessary parallel-array number of electricity storage devices and the cost of the storage power supply equipment 3 having the electricity storage unit which is configured by the second necessary parallel-array number of electricity storage devices is equal to or less than a previously-stored target cost value. And, the power equipment configuration conditions-specifying portion 18 is a processing portion in which where a total cost value of power supply equipment is equal to or less than a target cost value, the power-supplying contribution ratio $\gamma$ and the first necessary parallel-array number are output as configuration conditions of the integrated power supply equipment 2 and also the second necessary parallel-array number is output as configuration conditions of the storage power supply equipment 3, and where the total cost value of power supply equipment is in excess of the target cost value, the total cost value of power supply equipment at the time when the power-supplying contribution ratio $\gamma$ has been changed is calculated until the total cost value of power supply equipment becomes equal to or less than the target cost value.

Here, the configuration of the catenary system shown in FIG. 2A can be expressed by a circuit shown in FIG. 2B. SS and SS (station) depict respectively an electric power substation and an electric power substation annexed to a station. The electric power substation is provided with a transformer, a rectifier, a resistor and the like, thereby absorbing or supplying direct-current electricity to a catenary depending on loads (vehicles). It is shown that two vehicles (vehicle 10 and vehicle 20) travel under the catenary, one of them, that is, the vehicle 10 travels by electricity (it travels by using electricity from the catenary as electricity for motors, etc.), while the other of them, that is, the vehicle 20 is in the progress of regeneration. In this case, it can be considered as a circuit network shown in FIG. 2B. In the circuit network, catenary resistances $R_1$, $R_{2a}$, $R_{2b}$ can be determined in the simulation portion 12 of the analysis device 1 with reference to a distance between the two vehicles based on vehicle positions, a distance between the vehicles and power supply equipment, and a resistance value per unit length of the catenary.

Figure 3:
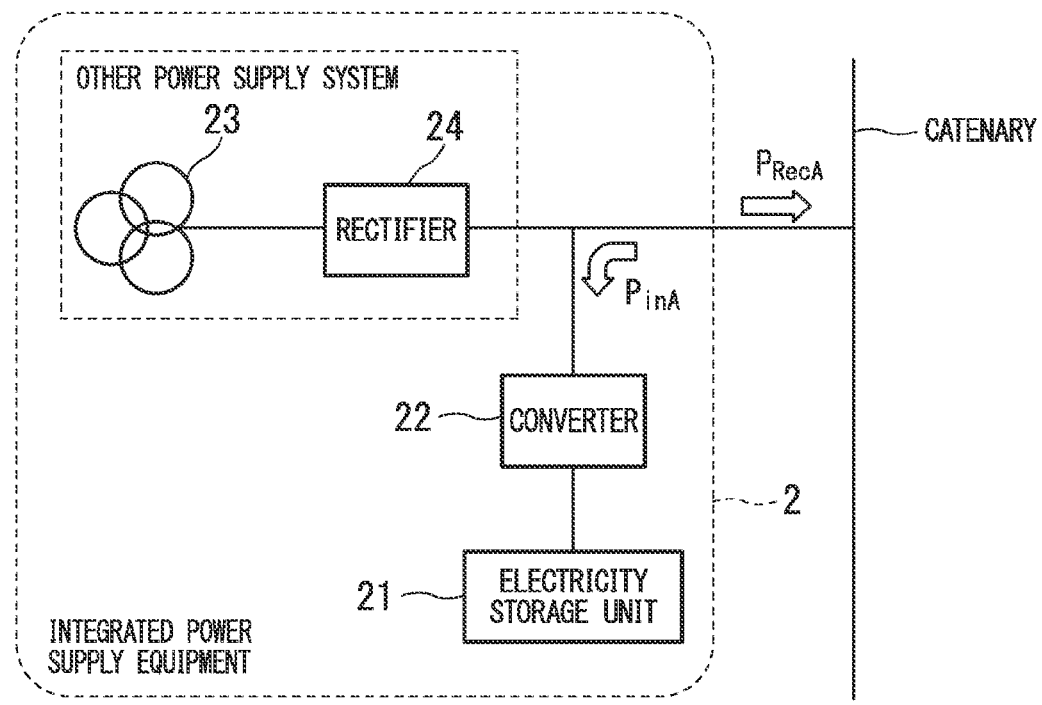
FIG. 3 is a first configuration diagram which shows integrated power supply equipment provided in a catenary system.

FIG. 3 is a first configuration diagram which shows integrated power supply equipment provided in a catenary system.

Figure 4:
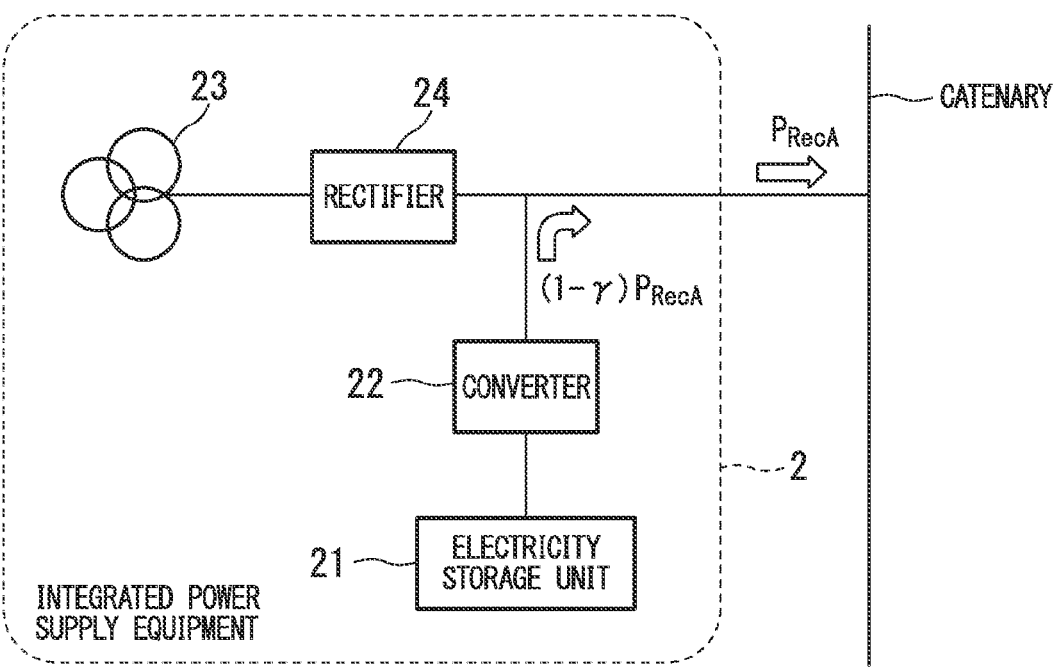
FIG. 4 is a second configuration diagram which shows the integrated power supply equipment provided in the catenary system.

FIG. 4 is a second configuration diagram which shows the integrated power supply equipment provided in the catenary system.

The integrated power supply equipment 2 is provided with a power system which is composed of an electricity storage unit 21 for accumulating electricity regenerated from a catenary and a converter 22 (DC-DC converter) which converts regenerated electricity input from the catenary to deliver the electricity to electricity storage devices inside the electricity storage unit 21 or converts electricity delivered from the electricity storage unit 21 and delivers the electricity to the catenary. Further, the integrated power supply equipment 2 is provided with the other power supply system which is composed of a transformer 23 for transforming electricity obtained from a power system of a power company or the like and a rectifier 24 for converting alternative currents delivered from the transformer 23 to direct currents and delivering the currents to the catenary. Then, in FIG. 3, average input electricity input to the electricity storage unit 21 side on regeneration is expressed as $P_{inA}$. Further, average output electricity output to the catenary side by the integrated power supply equipment 2 is expressed as $P_{RecA}$. Then, during a predetermined time period high in operation frequency of vehicles in a catenary-based transportation system, for example, during commuter rush hour, electricity output to the catenary from the electricity storage unit 21 side is expressed by $(1-\gamma)P_{RecA}$ when a contribution ratio of output electricity of the rectifier 24 is given as γ. This situation is shown in FIG. 4.

The electricity storage unit 21 retains electricity storage devices such as lithium ion batteries. A plurality of electricity storage devices may be connected in parallel inside the electricity storage unit 21. The analysis device 1 uses allowable input electricity and allowable output electricity for each single serial-array system in which the plurality of electricity storage devices are connected in series, thereby specifying the number of electricity storage devices arrayed in parallel inside the electricity storage unit 21 and a contribution ratio γ of output electricity of the rectifier 24 so as to be equal to or less than a target cost.

First Embodiment

Figure 5:
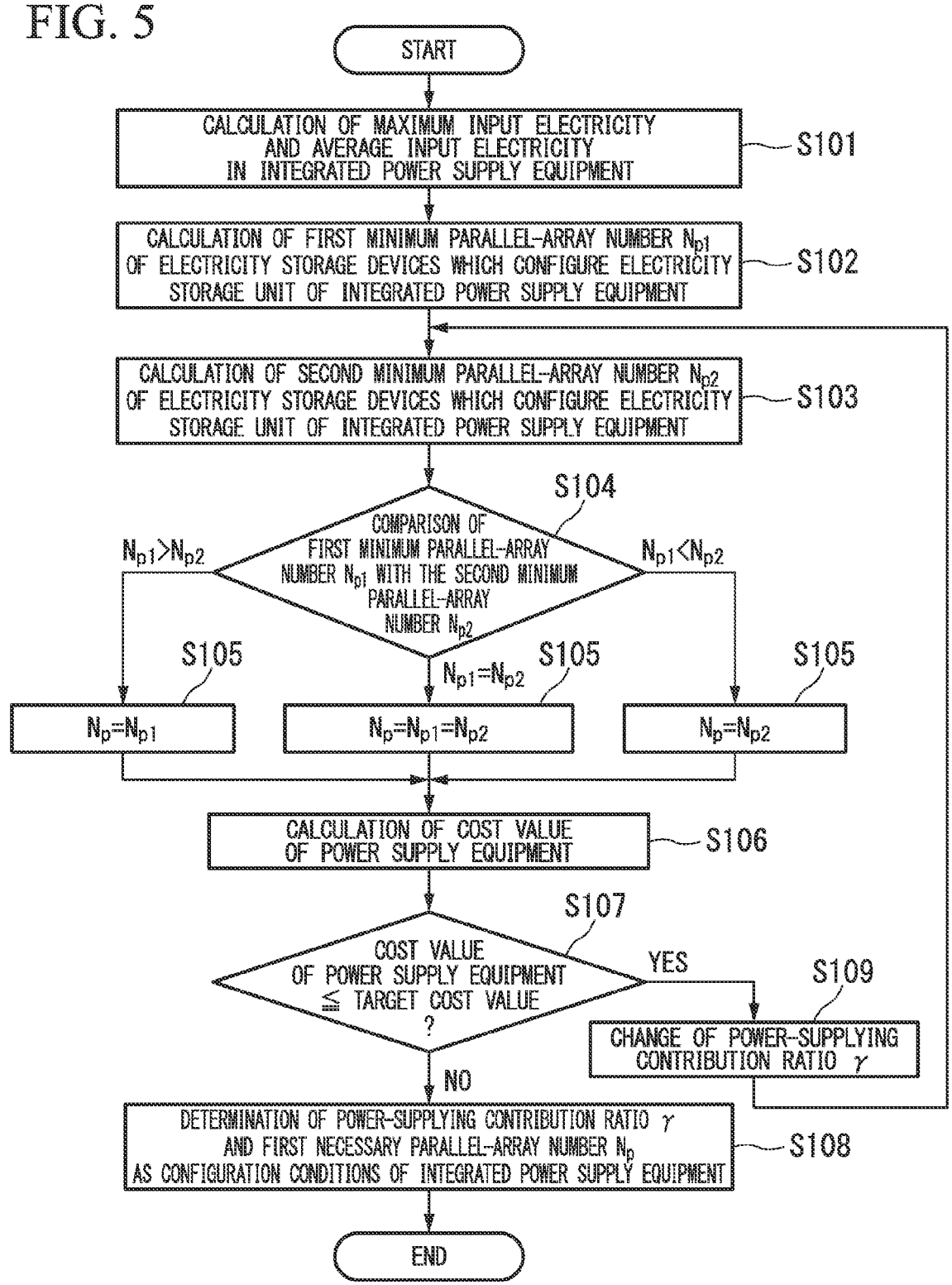
FIG. 5 is a flow chart which shows processing by an analysis device of a First Embodiment.

FIG. 5 is a flow chart which shows processing by an analysis device of a First Embodiment.

Next, a description will be given of a processing flow by the analysis device of the First Embodiment according to the order of processing.

The First Embodiment deals with the processing flow by the analysis device 1 which analyzes a catenary-based transportation system having the integrated power supply equipment 2 but not having the storage power supply equipment 3.

First, in the analysis device 1, the controller 11 notifies the simulation portion 12 of start of analysis processing. Then, on the assumption that the simulation portion 12 connects an inverter or a resistor to the electricity storage unit 21 side of the integrated power supply equipment 2 based on this notice, calculation is made for maximum input electricity $P_{invP}$ and average input electricity $P_{invA}$ of electricity which flows into the inverter or the resistor.

More specifically, the simulation portion 12 calculates the maximum input electricity $P_{invP}$ and the average input electricity $P_{invA}$ of the integrated power supply equipment 2 based on electricity at a position connecting to a catenary of the integrated power supply equipment 2 which varies every second with reference to a pantograph point position in contact with the catenary of a vehicle based on time and the like, power consumption of the vehicle at the pantograph point position, a distance from the position to the integrated power supply equipment 2, a resistance value per unit length of the catenary and the like (Step S101). It is acceptable that the maximum input electricity $P_{invP}$ and the average input electricity $P_{invA}$ are calculated separately by using a simulator or observed values be obtained and recorded in advance in the database 19.

Next, when the controller 11 detects that the maximum input electricity $P_{invP}$ and the average input electricity $P_{invA}$ have been calculated or they have been recorded in the database 19, the controller 11 instructs the first minimum parallel-array number-calculating portion 13 to start processing. Then, the first minimum parallel-array number-calculating portion 13 obtains the maximum input electricity $P_{invP}$ and the average input electricity $P_{invA}$ recorded in the database 19, thereby storing the thus calculated maximum input electricity $P_{invP}$ as maximum input electricity $P_{invA}$ which flows into the side of the electricity storage unit of the integrated power supply equipment 2, and also recording the thus calculated average input electricity $P_{invA}$ as average input electricity $P_{inA}$ of electricity flowing into the side of the electricity storage unit of the integrated power supply equipment 2 in a memory and the like.

Then, the first minimum parallel-array number-calculating portion 13 gives allowable input electricity $P_{BCP}$ which is allowable by a single serial-array system of electricity storage devices which configure the electricity storage unit 21 and a conversion efficiency of the converter 22 (conversion efficiency in a charging direction) as $\eta_{DC}$. And, the first minimum parallel-array number-calculating portion 13 calculates a minimum integer $N_{p1}$ greater than a proportion of electricity of the maximum input electricity $P_{inP}$ after conversion by the converter 22 ($\eta_{DC} \times P_{inP}$) to the allowable input electricity $P_{BCP}$ as a first minimum parallel-array number of electricity storage devices which configure the electricity storage unit 21 of the integrated power supply equipment by using the following formula (1) (Step S102).

[Mathematical formula 1]

$$N_{p1} > \frac{\eta_{DC} P_{inP}}{P_{BCP}} \quad (1)$$

The first minimum parallel-array number is a parallel-array number of electricity storage devices which configure the electricity storage unit 21 and determined in view of the maximum input electricity $P_{invP}$. Here, the allowable input electricity $P_{BCP}$ which is allowable by the single serial-array system of the electricity storage devices is a value determined by a serial array number of electricity storage devices per single serial-array system set in advance in the electricity storage unit 21 and characteristics of the electricity storage devices which configure the electricity storage unit 21. The number of electricity storage devices connected to the single serial-array system is also recorded in the database 19. This information is used to carry out calculation processing. Then, when the first minimum parallel-array number-calculating portion 13 calculates a first minimum parallel-array number $N_{p1}$, the controller 11 then instructs the second minimum parallel-array number-calculating portion 14 to start processing.

Here, in order to suppress electricity supplied from the side of the rectifier 24 (the side of the other power supply system) as much as possible at the time when electricity is output from the integrated power supply equipment 2 to a catenary, it is necessary to discharge more electricity from the side of the electricity storage unit 21. However, excessive discharge will result in a decrease in SOC (state of charge: charging rate) of the electricity storage unit 21 and fall below a lower limit. When the SOC is decreased, the battery itself is decreased in voltage, which is outside a voltage range where the battery itself is usable. This may result in failure of operating the electricity storage unit. In particular, during a predetermined time period highest in operation frequency of vehicles in a catenary-based transportation system (for example, from the start of commuter rush hour to the end of commuter rush hour), discharged capacity of the electricity storage unit 21 may exceed charged capacity. Therefore, it is necessary to reduce the amount of electric energy to an allowable extent during the predetermined time period. Thus, calculation is made with reference to the following formulas to specify a minimum parallel-array number $N_{p2}$ of electricity storage unit 21 which satisfies the above conditions.

That is, in the second minimum parallel-array number-calculating portion 14, a minimum integer $N_{p2}$ which satisfies such conditions that a sum of the amount of reduced electric energy $E_{BUse}$ [Wh] of the electricity storage unit 21 during a predetermined time period highest in operation frequency of vehicles in a catenary-based transportation system and charged capacity $E_{BReg}$ [Wh] accumulated in the electricity storage unit 21 based on electricity regenerated during the predetermined time period is in excess of discharged capacity $E_{BD}$ of the electricity storage unit 21 in the case of a power-supplying contribution ratio γ of the other power supply system in a total discharged capacity of the integrated power supply equipment 2 is calculated as a second minimum parallel-array number of electricity storage devices which configure the electricity storage unit 21 with reference to the following formulas (2), (3), (4), (5) and (6).

Here, where SOC of the electricity storage unit 21 at the time of starting the predetermined time period (time of starting commuter rush hour) is given as $SOC_H$, SOC of the electricity storage unit 21 at the time of ending the predetermined time period (time of ending commuter rush hour) is given as $SOC_L$, the number of electricity storage devices per single serial-array system of the electricity storage devices which configure the electricity storage unit 21 is given as $N_s$, a parallel-array number of electricity storage devices which configure the electricity storage unit 21 is given as $N_{p2}$, and capacity of a single electricity storage device is given as $E_{BCell}$ [Wh], the amount of reduced electric energy $E_{BUse}$ [Wh] of the electricity storage unit 21 during the predetermined time period can be expressed by the following formula (2).

[Mathematical Formula 2]

$$E_{BUse} = N_{p2} N_s E_{BCell}(SOC_H - SOC_L) \quad (2)$$

Further, where the time of starting the predetermined time period is given as t_start, the time of ending the time period is given as t_end, and an instantaneous value of electricity flowing into the side of the electricity storage unit 21 is given as $P_{inA}(t)$ [W], charged capacity $E_{BReg}$ [Wh] which is charged to the electricity storage unit 21 by regeneration during the predetermined time period can be expressed by the following formula (3).

[Mathematical Formula 3]

$$E_{BReg} = \eta_{DC} \int_{t\_start}^{t\_end} P_{inA}(t)dt \quad (3)$$

Still further, discharged capacity $E_{BD}$ of the electricity storage unit 21 where a power-supplying contribution ratio from the other power supply system is given as γ in a total discharged capacity of the integrated power supply equipment 2 can be expressed by the following formula (4), if an instantaneous value of average output electricity $P_{RecA}$ of the integrated power supply equipment 2 is given as $P_{RecA}(t)$.

[Mathematical formula 4]

$$E_{BD} = \frac{(1-\gamma)}{\eta_{DC}} \int_{t\_start}^{t\_end} P_{RecA}(t)dt \quad (4)$$

Therefore, a minimum integer $N_{p2}$ which satisfies such conditions that a sum of the amount of reduced electric energy $E_{BUse}$ [Wh] of the electricity storage unit 21 during a predetermined time period highest in operation frequency of vehicles in a catenary-based transportation system and charged capacity $E_{BReg}$ [Wh] accumulated in the electricity storage unit 21 based on electricity regenerated during the predetermined time period is in excess of discharged capacity $E_{BD}$ of the electricity storage unit 21 in the case of power-supplying contribution ratio γ of the other power supply system in a total discharged capacity of the integrated power supply equipment 2 can be expressed based on the following formula (5) by the following formula (6).

[Mathematical formula 5]

$$E_{BUse} + E_{BReg} > E_{BD} \quad (5)$$

[Mathematical formula 6]

$$N_{P2} > \frac{(1-\gamma)\int_{t\_start}^{t\_end} P_{RecA}(t)dt - \eta_{DC}^2 \int_{t\_start}^{t\_end} P_{inA}(t)dt}{\eta_{DC} N_s E_{BCell}(SOC_H - SOC_L)} \quad (6)$$

Then, the second minimum parallel-array number-calculating portion 14 calculates a minimum integer $N_{p2}$ which satisfies the formula (6) as a second minimum parallel-array number of electricity storage devices which configure the electricity storage unit 21 (Step S103).

When the first minimum parallel-array number-calculating portion 13 calculates the first minimum parallel-array number $N_{p1}$ and the second minimum parallel-array number-calculating portion 14 calculates the second minimum parallel-array number $N_{p2}$, the controller 11 then instructs the portion for specifying the number of electricity storage devices arrayed in parallel 17 to start processing. As a result, the portion for specifying the number of electricity storage devices arrayed in parallel 17 compares the first minimum parallel-array number $N_{p1}$ with the second minimum parallel-array number $N_{p2}$ (Step S104) and specifies a greater value as a first necessary parallel-array number $N_p$ of electricity storage devices which configure the electricity storage unit 21 inside the integrated power supply equipment 2 (Step S105). That is, where there is found a relationship of $N_{p1} > N_{p2}$, the first necessary parallel-array number $N_p = N_{p1}$ is recorded in a memory and the like. Where there is found a relationship of $N_{p2} > N_{p1}$, the first necessary parallel-array number $N_p = N_{p2}$ is recorded in a memory and the like. Where there is found a relationship of $N_{p1} = N_{p2}$, an equal value thereof is recorded as the first necessary parallel-array number $N_p$ in a memory and the like.

Further, when the portion for specifying the number of electricity storage devices arrayed in parallel 17 specifies the first necessary parallel-array number $N_p$ of electricity storage devices which configure the electricity storage unit 21, the controller 11 then instructs the power equipment configuration conditions-specifying portion 18 to start processing. Then, the power equipment configuration conditions-specifying portion 18 calculates a cost value of power supply equipment which is composed of the cost of the other power supply system in the case of the power-supplying contribution ratio γ (total costs of the rectifier 24 in the case of the power-supplying contribution ratio γ60 and the transformer 23 at this time), the cost of the electricity storage unit 21 which is configured by the first necessary parallel-array number $N_p$ of electricity storage devices (the number of electricity storage devices Ns per single serial-array system) and the cost of the converter 22 (Step S106) and determines whether or not the cost value of the power supply equipment concerned is equal to or less than a target cost value which is stored in advance in the database 19 (Step S107).

It is to be noted that a cost value of a single electricity storage device is kept in database 19. The power equipment configuration conditions-specifying portion 18 is able to calculate the cost of the electricity storage unit 21 with reference to "a cost value of a single electricity storage device×$N_p$×Ns." Further, a cost value of the converter 22, a cost value of the transformer 23 in the case of the power-supplying contribution ratio γ and a cost value of a transformer necessary at this time are to be recorded in advance in the database 19. Then, where the cost value of power supply equipment is equal to or less than a target cost value, the power equipment configuration conditions-specifying portion 18 determines the power-supplying contribution ratio γ and the first necessary parallel-array number $N_p$ as configuration conditions of the integrated power supply equipment (Step S108) and displays them on a display portion or the like. On the other hand, where the cost value of power supply equipment is in excess of the target cost value, the power equipment configuration conditions-specifying portion 18 changes the power-supplying contribution ratio γ (Step S109). Then, the analysis device 1 repeats the above processing of Step S103 and thereafter to calculate a cost value of power supply equipment and carries out processing which determines whether or not the cost value of power supply equipment is equal to or less than the target cost value until the cost value of power supply equipment becomes equal to or less than the target cost value.

Where a plurality of integrated power supply equipment 2 is provided in a catenary system, the number thereof is multiplied by a cost value in the case of one integrated power supply equipment, thus making it possible to calculate a cost value of power supply equipment that the catenary system has. Then, the thus obtained value may be compared with the target cost value.

Figure 6:
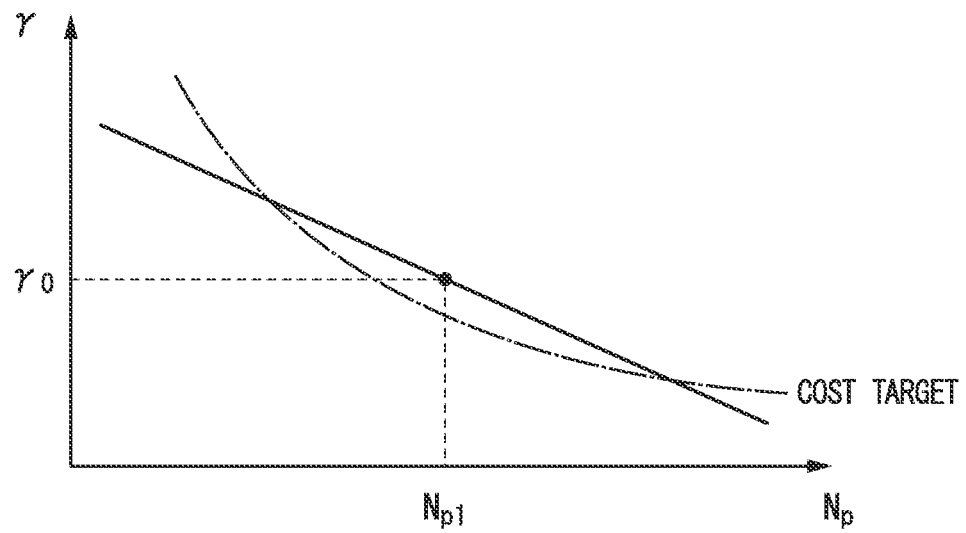
FIG. 6 is a drawing which shows a relationship between a power-supplying contribution ratio $\gamma$ of the other power supply system and the number of electricity storage devices arrayed in parallel which configure an electricity storage unit as well as a relationship with a cost target.

FIG. 6 is a drawing which shows a relationship between a power-supplying contribution ratio γ of the other power supply system and a parallel-array number of electricity storage devices which configure the electricity storage unit as well as a relationship with a cost target.

As shown in this drawing, in a catenary-based transportation system to be analyzed by the analysis device 1 of the present embodiment, a minimum parallel-array number $N_p$ of electricity storage devices which configure the electricity storage unit 21 is decreased with an increase in power-supplying contribution ratio γ of the other power supply system. The minimum parallel-array number $N_p$ of electricity storage devices which configure the electricity storage unit 21 is increased with a decrease in power-supplying contribution ratio γ of the other power supply system. Then, in order to keep costs equal to or less than a cost target, it is necessary to increase or decrease the power-supplying contribution ratio γ of the other power supply system. In the analysis device 1 of the present embodiment, the power equipment configuration conditions-specifying portion 18 changes the power-supplying contribution ratio γ until the cost value of power supply equipment becomes equal to or less than a target cost value, where the cost value of power supply equipment is in excess of the target cost value. Calculation for making another determination as to whether or not the cost value becomes equal to or less than the target cost value may be made either by a method for increasing the value of γ or by a method for decreasing the value of γ. A determination may be made as to whether or not the value of γ is increased or decreased and how much the value is changed, for example, based on the relationship shown in FIG. 6.

A description has been so far given of the embodiment of the present invention. According to the processing of the First Embodiment, where the catenary-based transportation system is provided with the integrated power supply equipment 2, it is possible to determine the configuration conditions of power supply equipment so that the cost value of the integrated power supply equipment 2 is less than a target cost value.

Second Embodiment

Figure 7:
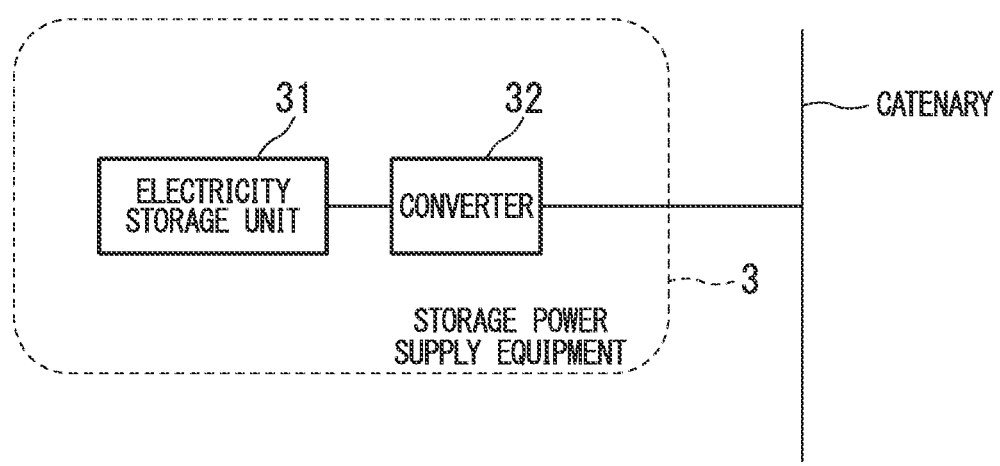
FIG. 7 is a configuration diagram which shows storage power supply equipment provided in the catenary system.

FIG. 7 is a configuration diagram which shows storage power supply equipment provided on a catenary system.

Figure 8:
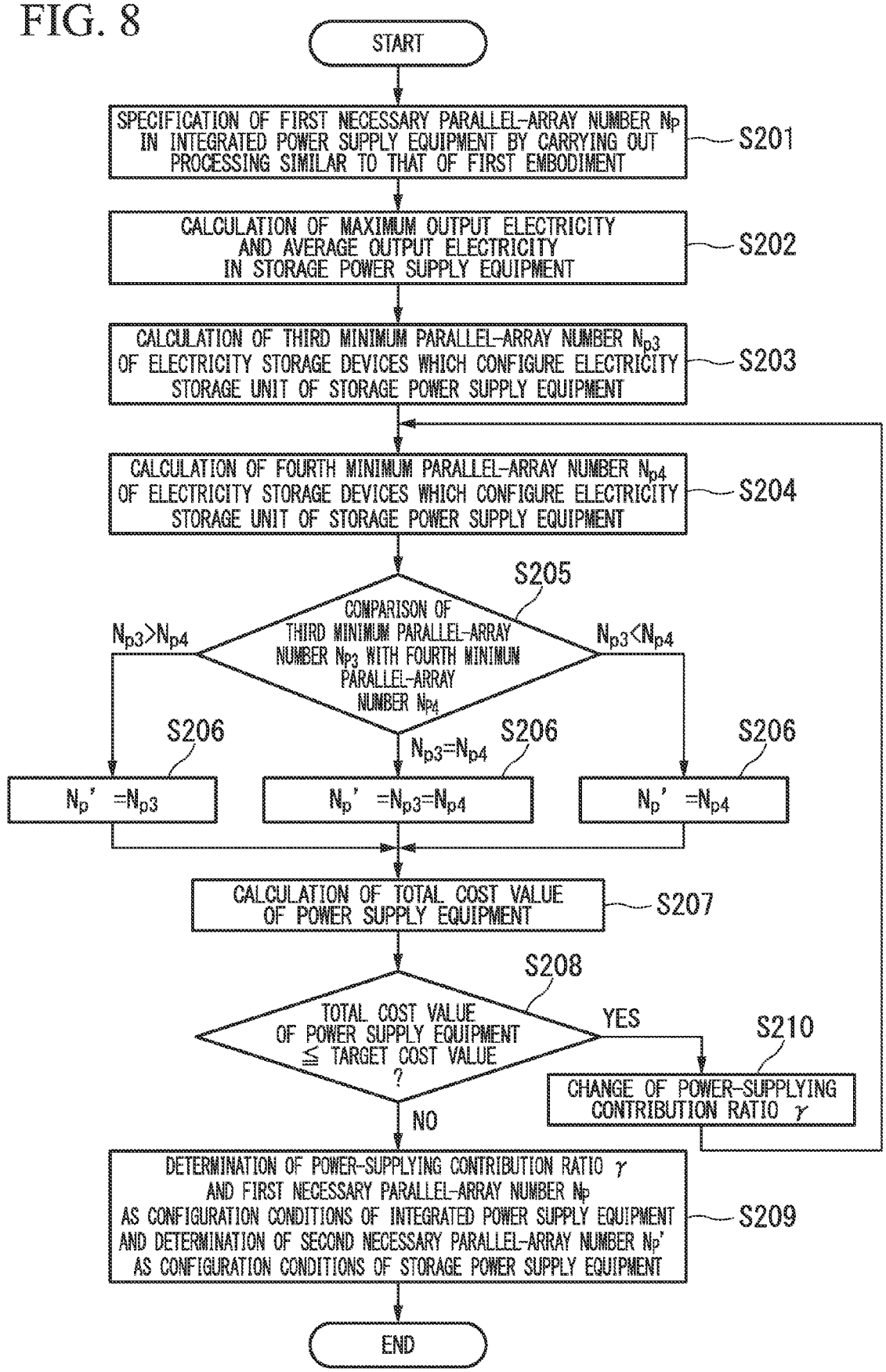
FIG. 8 is a flow chart which shows processing by an analysis device of a Second Embodiment.

FIG. 8 is a flow chart which shows processing by an analysis device of a Second Embodiment.

Next, a description will be given of a processing flow by the analysis device of the Second Embodiment according to the order of processing.

The present embodiment deals with the processing flow by the analysis device 1 which analyzes a catenary-based transportation system having both integrated power supply equipment 2 and storage power supply equipment 3.

First, the analysis device 1 carries out processing of Step S101 to Step S105, as with the First Embodiment, thereby specifying a first necessary parallel-array number $N_p$ in the integrated power supply equipment 2 (Step S201).

In order to specify a necessary parallel-array number of electricity storage devices inside the electricity storage unit 31 provided in the storage power supply equipment 3, the controller 11 then notifies the simulation portion 12 of start of analysis processing. Based on this notice, the simulation portion 12 calculates maximum output electricity $P_{RecP}$ and average output electricity $P_{RecA}$, of electricity output from the rectifier, on the assumption that the rectifier is connected to the site of the storage power supply equipment 3. In this case, the simulation portion 12 calculates maximum output electricity $P_{RecP}$ and the average output electricity $P_{RecA}$ at a point connecting to a catenary of the storage power supply equipment 3 based on electricity at a position connecting to the catenary of the storage power supply equipment 3 which varies every second with reference to a pantograph point position in contact with the catenary of a vehicle based on time and the like, power consumption of the vehicle at the pantograph point position, a distance from the position to the storage power supply equipment 3, a resistance value per unit length of the catenary, an electricity output value and electricity input value of the integrated power supply equipment 2 and the like (Step S202). It is acceptable that the maximum output electricity $P_{RecP}$ and the average output electricity $P_{RecA}$ be separately calculated by using a simulator and recorded in advance in the database 19 or an observed value be obtained and recorded in the database 19. While the maximum input electricity is calculated in the First Embodiment, the maximum output electricity is calculated in the Second Embodiment. This is because in the First Embodiment, the maximum input electricity is greater than the maximum output electricity due to the existence of the other power supply system. However, in the Second Embodiment, the maximum output electricity is greater than the maximum input electricity due to the absence of the other power supply system.

Next, when the controller 11 detects that the maximum output electricity $P_{RecP}$ and the average output electricity $P_{RecA}$ have been calculated or that they have been recorded in the database 19, the controller 11 instructs the third minimum parallel-array number-calculating portion 15 to start processing. Then, the third minimum parallel-array number-calculating portion 15 obtains the maximum output electricity $P_{RecP}$ and the average output electricity $P_{RecA}$ which have been calculated by the simulation portion 12, stores the thus calculated maximum output electricity $P_{RecP}$ as the maximum output electricity $P_{RecP}$ output from the storage power supply equipment 3 and also stores the thus calculated average input electricity $P_{RecA}$ as average input electricity $P_{RecA}$ output from the storage power supply equipment 3.

Then, the third minimum parallel-array number-calculating portion 15 gives allowable output electricity $P_{BDP}$ which is allowable by a single serial-array system of electricity storage devices which configure the electricity storage unit 31 and a DC-DC converter efficiency of the converter 32 as $\eta_{DC}$, thereby calculating a minimum integer $N_{p3}$ greater than a proportion of electricity ($P_{RecP}/\eta_{DC}$) of the maximum output electricity $P_{RecP}$ after conversion by the converter 32 to the allowable input electricity $P_{BDP}$ as a third minimum parallel-array number of electricity storage devices which configure the electricity storage unit 31 by using the following formula (7) (Step S203).

[Mathematical formula 7]

$$N_{p3} > \frac{P_{RecP}}{\eta_{DC} P_{BCP}} \qquad (7)$$

The third minimum parallel-array number is a parallel-array number of electricity storage devices which configure the electricity storage unit 31 and determined in view of the maximum output electricity $P_{RecP}$. In this case, the allowable output electricity $P_{BDP}$ which is allowable by a single serial-array system of electricity storage devices which configure the electricity storage unit 31 of the storage power supply equipment 3 is a value which is determined by a serial array number of electricity storage devices per single serial-array system set in advance for the electricity storage unit 31 and characteristics of the electricity storage devices which configure the electricity storage unit 31. Then, when the third minimum parallel-array number-calculating portion 15 calculates the third minimum parallel-array number $N_{p3}$, the controller 11 then instructs the fourth minimum parallel-array number-calculating portion 16 to start processing.

Here, during a predetermined time period highest in operation frequency of vehicles in a catenary-based transportation system (for example, time period from the time of starting commuter rush hour to the time of ending commuter rush hour), the discharged capacity of the electricity storage unit 31 is in excess of the charged capacity. Therefore, the electricity storage devices which configure the electricity storage unit 31 are required to reduce the amount of electric energy to an allowable extent during the predetermined time period. Thus, calculation for specifying a minimum parallel-array number $N_{p4}$ of the electricity storage unit 31 which satisfies the above condition is determined by the following formulas.

That is, in the fourth minimum parallel-array number-calculating portion 16, the minimum integer $N_{p4}$ which satisfies such conditions that a sum of the amount of reduced electric energy $E_{BUse2}$ [Wh] of the electricity storage unit 31 during a predetermined time period highest in operation frequency of vehicles in a catenary-based transportation system and charged capacity $E_{BReg2}$ [Wh] accumulated in the electricity storage unit 31 based on electricity regenerated during the predetermined time period is in excess of discharged capacity $E_{BD2}$ of the electricity storage unit 31 of the storage power supply equipment 3 is calculated as a fourth minimum parallel-array number of electricity storage devices which configure the electricity storage unit 31 with reference to the following formulas (8), (9), (10), (11) and (12).

In this case, where SOC of the electricity storage unit 31 at the time of starting the predetermined time period (the time of starting commuter rush hour) is given as $SOC_H$, SOC of the electricity storage unit 31 at the time of ending the predetermined time period (the time of ending commuter rush hour) is given as $SOC_L$, the number of electricity storage devices per single serial-array system of electricity storage devices which configure the electricity storage unit 31 is given as $N_S$, a parallel-array number of electricity storage devices which configure the electricity storage unit 21 is given as $N_{p2}$ and the capacity of a single electricity storage device is given as $E_{BCell}$ [Wh], the amount of reduced electric energy $E_{BUse2}$ [Wh] of the electricity storage unit 31 during the predetermined time period can be expressed by the following formula (8).

[Mathematical Formula 8]

$$E_{BUse2} = N_{p4} N_S E_{BCell}(SOC_H - SOC_L) \qquad (8)$$

Further, where the time of starting the predetermined time period is given as t_start, the time of ending it is given as t_end and an instantaneous value of electricity output from the storage power supply equipment 3 is given as $P_{inA}(t)$ [W], charged capacity $E_{BReg2}$ [Wh] which is charged to the electricity storage unit 21 by regeneration during the predetermined time period can be expressed by the following formula (9).

[Mathematical Formula 9]

$$E_{BReg2} = \eta_{DC} \int_{t\_start}^{t\_end} P_{inA}(t) dt \qquad (9)$$

Further, the discharged capacity $E_{BD2}$ of the electricity storage unit 21 which configures the storage power supply equipment 3 can be expressed by the following formula (10), if an instantaneous value of average output electricity $P_{RecA}$ of the storage power supply equipment 3 is given as $P_{RecA}(t)$.

[Mathematical formula 10]

$$E_{BD2} = \frac{(1-\gamma)}{\eta_{DC}} \int_{t\_start}^{t\_end} P_{RecA}(t) dt \qquad (10)$$

Therefore, a minimum integer $N_{p4}$ which satisfies such conditions that a sum of the amount of reduced electric energy $E_{BUse2}$ [Wh] of the electricity storage unit 31 during a predetermined time period highest in operation frequency of vehicles in a catenary-based transportation system and charged capacity $E_{BReg2}$ [Wh] accumulated in the electricity storage unit 31 based on electricity regenerated during the predetermined time period is in excess of discharged capacity $E_{BD2}$ of the electricity storage unit 31 which configures the storage power supply equipment 3 can be expressed based on the following formula (11) by the following formula (12).

[Mathematical formula 11]

$$E_{BUse2} + E_{BReg2} > E_{BD2} \qquad (11)$$

[Mathematical formula 12]

$$N_{p4} > \frac{(1-\gamma)\int_{t\_start}^{t\_end} P_{RecA}(t) dt - \eta_{DC}^2 \int_{t\_start}^{t\_end} P_{inA}(t) dt}{\eta_{DC} N_S E_{BCell}(SOC_H - SOC_L)} \qquad (12)$$

Then, the second minimum parallel-array number-calculating portion 14 calculates the minimum integer $N_{p4}$ which satisfies the formula (12) as a fourth minimum parallel-array number of electricity storage devices which configure the electricity storage unit 31 (Step S204).

When the third minimum parallel-array number-calculating portion 15 calculates the third minimum parallel-array number $N_{p3}$ and the fourth minimum parallel-array number-calculating portion 16 calculates the fourth minimum parallel-array number $N_{p4}$, the controller 11 then instructs the portion for specifying the number of electricity storage devices arrayed in parallel 17 to start processing. Then, the portion for specifying the number of electricity storage devices arrayed in parallel 17 compares the third minimum parallel-array number $N_{p3}$ with the fourth minimum parallel-array number $N_{p4}$ (Step S205) and specifies a greater value as a second necessary parallel-array number $N_p'$ of electricity storage devices which configure the electricity storage unit 31 of the storage power supply equipment 3 (Step S206). That is, where there is found a relationship of $N_{p3}>N_{p4}$, the second necessary parallel-array number $N_p'=N_{p3}$ is recorded in a memory or the like. Where there is found a relationship of $N_{p4}>N_{p3}$, the second necessary parallel-array number $N_p'=N_{p4}$ is recorded in a memory or the like. It is to be noted that where there is found a relationship of $N_{p3}=N_{p4}$, an equal value thereof is recorded as the second necessary parallel-array number $N_p'$ in a memory or the like.

Then, when the portion for specifying the number of electricity storage devices arrayed in parallel 17 specifies the second necessary parallel-array number $N_p'$ of electricity storage devices which configure the electricity storage unit 31 of the storage power supply equipment 3, the controller 11 then instructs the power equipment configuration conditions-specifying portion 18 to start processing. Accordingly, the power equipment configuration conditions-specifying portion 18 calculates a total cost value of power supply equipment which is composed of the cost of the other power supply system in the case of the power-supplying contribution ratio γ, the cost of the integrated power supply equipment 2 made up of the cost of electricity storage unit 21 configured by the first necessary parallel-array number $N_p$ of electricity storage devices and the cost of the converter 22, and the cost of the storage power supply equipment 3 provided with the electricity storage unit 31 which is configured by the second necessary parallel-array number $N_p'$ of electricity storage devices (total costs of the electricity storage unit 31 and the converter 32) (Step S207) and determines whether or not the total cost value of power supply equipment is equal to or less than a previously-stored target cost value (Step S208).

It is to be noted that the total cost value of power supply equipment is calculated by reading necessary information from the database 19, as with the First Embodiment. Then, where the total cost value of power supply equipment is equal to or less than a target cost value, the power equipment configuration conditions-specifying portion 18 determines the power-supplying contribution ratio γ and the first necessary parallel-array number $N_p$ as configuration conditions of the integrated power supply equipment and outputs them on a display portion or the like and also determines the second necessary parallel-array number $N_p'$ as configuration conditions of the storage power supply equipment 3 (Step S209), thereby outputting them on a display portion or the like. On the other hand, where the total cost value of power supply equipment is in excess of a target cost value, the power equipment configuration conditions-specifying portion 18 changes the power-supplying contribution ratio γ of the other power supply system of the integrated power supply equipment 2 (Step S210). Then, the analysis device 1 repeats the above-described processing of Step S204 and thereafter to calculate the total cost value of power supply equipment and carries out processing which determines whether or not the total cost value of power supply equipment is equal to or less than the target cost value until the total cost value of power supply equipment becomes equal to or less than the target cost value.

The embodiments of the present invention have been so far described. According to the processing of the Second Embodiment, it is possible to determine the configuration conditions of power supply equipment so that the total cost value of power supply equipment becomes less than a target cost value in the case that a catenary-based transportation system is provided with the integrated power supply equipment 2 and the storage power supply equipment 3.

Here, in the First Embodiment and Second Embodiment which have been described so far, a power-supplying contribution ratio γ of the other power supply system which is an initial value is calculated as follows. That is, the simulation portion 12 of the analysis device 1 uses the above-described formula (1) to determine a minimum parallel-array number of electricity storage devices which configure the electricity storage unit 21 and also determines the electric energy delivery amount of the other power supply system and electric energy delivered from the side of the electricity storage unit, where the integrated power supply equipment 2 is provided with the electricity storage unit 21 configured by the minimum parallel-array number of electricity storage devices or where a catenary-based transportation system is further provided with the storage power supply equipment 3 having the electricity storage unit 31 configured by the minimum parallel-array number of electricity storage devices. Then, the simulation portion 12 carries out calculation in which the power-supplying contribution ratio γ of the other power supply system is equal to the electric energy delivery amount of the other power supply system which is divided by (electric energy delivery amount of the other power supply system+ electric energy delivered from the side of the electricity storage unit 21).

In simulation processing by the simulation portion 12, the electric energy delivery amount of the other power supply system can be calculated in advance by an integration value of delivery electricity to the other power supply system at each time which varies with the lapse of time. Further, in simulation processing by the simulation portion 12, the electric energy delivered from the side of the electricity storage unit 21 can be calculated by an initial battery control voltage setting value of the converter 22 and an integration value of electricity delivered from the side of the electricity storage unit 21 at each time which varies with the lapse of time. The battery control voltage setting value of the converter 22 is a setting value at which the value thereof can be adjusted to adjust the electric energy delivered from the electricity storage unit 21.

The above-described analysis device is internally provided with a computer system. And, the steps of individual processing are stored at a computer-readable recording medium in the format of a program. A computer reads and carries out the program to execute the above processing. In this case, the computer-readable recording media include a magnetic disc, magneto-optical disk, CD-ROM, DVD-ROM and semiconductor memory. It is acceptable that this computer program be distributed to a computer via a communication line and the program be carried out by using the computer to which the program has been distributed.

Further, the program may be such that it partially realizes the previously described functions.

Still further, there may also be acceptable a so-called difference file (difference program) which is able to realize the previously described functions in combination with a program which has already been recorded in a computer system.

INDUSTRIAL APPLICABILITY

According to a mode of the present invention, it is possible to provide an analysis device which can make a reliable determination so that a configuration which has a significant influence on the cost of the power supply equipment concerned, of power supply equipment provided in a catenary-based transportation system, becomes equal to or less than a target cost of the power supply equipment concerned.

DESCRIPTION OF REFERENCE NUMERALS

1: analysis device
2: integrated power supply equipment
3: storage power supply equipment
11: controller
12: simulation portion
13: first minimum parallel-array number-calculating portion
14: second minimum parallel-array number-calculating portion
15: third minimum parallel-array number-calculating portion
16: fourth minimum parallel-array number-calculating portion
17: portion of specifying the number of electricity storage devices arrayed in parallel
18: power equipment configuration conditions-specifying portion
19: database

The invention claimed is:

1. An analysis device of a catenary-based transportation system which is provided with integrated power supply equipment having an electricity storage unit which stores electricity regenerated by vehicles traveling by electricity received from a catenary and also supplies electricity to the catenary and another power supply system which is a power supply system different from the electricity storage unit, the analysis device comprising:

a first minimum parallel-array number-calculating portion in which based on maximum input electricity input to the electricity storage unit and allowable input electricity which is allowed by a single serial-array system of electricity storage devices which configure the electricity storage unit in the catenary-based transportation system, a minimum integer greater than a proportion of the maximum input electricity to the allowable input electricity is calculated as a first minimum parallel-array number of the electricity storage devices which configure the electricity storage unit;

a second minimum parallel-array number-calculating portion in which a minimum integer which satisfies such conditions that a sum of the amount of reduced electric energy of the electricity storage unit during a predetermined time period highest in operation frequency of the vehicles in the catenary-based transportation system and charged capacity accumulated in the electricity storage unit based on electricity regenerated during the predetermined time period is in excess of discharged capacity of the electricity storage unit in the case of a power-supplying contribution ratio γ of the other power supply system in a total discharged capacity of the integrated power supply equipment is calculated as a second minimum parallel-array number of the electricity storage devices which configure the electricity storage unit;

a portion for specifying the number of electricity storage devices arrayed in parallel in which a greater value obtained by comparing the first minimum parallel-array number with the second minimum parallel-array number is specified as a first necessary parallel-array number of electricity storage devices which configure the electricity storage unit; and a power equipment configuration conditions-specifying portion in which a determination is made as to whether or not a cost value of power supply equipment which is composed of the cost of the other power supply system in the case of the power-supplying contribution ratio γ and the cost of the electricity storage unit configured by the first necessary parallel-array number of electricity storage devices is equal to or less than a previously-stored target cost value, where the cost value of power supply equipment is equal to or less than the target cost value, the power-supplying contribution ratio γ and the first necessary parallel-array number are output as configuration conditions of the integrated power supply equipment, and where the cost value of power supply equipment is in excess of the target cost value, the cost value of power supply equipment is calculated by changing the power-supplying contribution ratio γ until the cost value of power supply equipment becomes equal to or less than the target cost value.

2. The analysis device according to claim 1, wherein the catenary-based transportation system further comprises a storage power supply equipment which includes an electricity storage unit connected to a site different from a position at which the other power supply system is connected to a catenary, wherein the analysis device further comprises:

a third minimum parallel-array number-calculating portion in which based on maximum output electricity output from the electricity storage unit of the storage power supply equipment and allowable output electricity which is allowed by a single serial-array system of electricity storage devices which configure the electricity storage unit of the storage power supply equipment, a minimum integer greater than a proportion of the maximum output electricity to the allowable output electricity is calculated as a third minimum parallel-array number of electricity storage devices which configure the electricity storage unit of the storage power supply equipment; and a fourth minimum parallel-array number-calculating portion in which a minimum integer which satisfies such conditions that a sum of the amount of reduced electric energy of the electricity storage unit of the storage power supply equipment during a predetermined time period highest in operation frequency of the vehicles in the catenary-based transportation system and charged capacity accumulated in the electricity storage unit of the storage power supply equipment based on electricity regenerated during the predetermined time period is in excess of discharged capacity of the storage power supply equipment is calculated as a fourth minimum parallel-array number of electricity storage devices which configure the electricity storage unit of the storage power supply equipment, wherein the portion for specifying the number of electricity storage devices arrayed in parallel compares the third minimum parallel-array number with the fourth minimum parallel-array number and specifies a greater value as a second necessary parallel-array number of electricity storage devices which configure the electricity storage unit of the storage power supply equipment, and wherein the power equipment configuration conditions-specifying portion determines whether or not a total cost value of power supply equipment which is composed of the cost of the other power supply system in the case of the power-supplying contribution ratio γ, the cost of the electricity storage unit of the integrated power supply equipment which is configured by the first necessary parallel-array number of electricity storage devices, and the cost of the storage power supply equipment having the electricity storage unit which is configured by the second necessary parallel-array number of electricity storage devices is equal to or less than a previously-stored target cost value, wherein the power equipment configuration conditions-specifying portion outputs the power-supplying contribution ratio γ and the first necessary parallel-array number as configuration conditions of the integrated power supply equipment and also outputs the second necessary parallel-array number as configuration conditions of the storage power supply equipment, where the total cost value of power supply equipment is equal to or less than the target cost value, and wherein the power equipment configuration conditions-specifying portion calculates the total cost value of power supply equipment by changing the power-supplying contribution ratio γ until the total cost value of power supply equipment becomes equal to or less than the target cost value, where the total cost value of power supply equipment is in excess of the target cost value.

3. An analysis method by an analysis device of a catenary-based transportation system which is provided with integrated power supply equipment having an electricity storage unit which stores electricity regenerated from vehicles traveling by electricity received from a catenary and also supplies electricity to the catenary and the other power supply system which is a power supply system different from the electricity storage unit concerned, the analysis method comprising:

calculating a minimum integer greater than a proportion of maximum input electricity to allowable input electricity as a first minimum parallel-array number of the electricity storage devices which configure the electricity storage unit based on the maximum input electricity input to the electricity storage unit and the allowable input electricity which is allowed by a single serial-array system of electricity storage devices which configure the electricity storage unit in the catenary-based transportation system;

calculating a minimum integer as a second minimum parallel-array number of the electricity storage devices which configure the electricity storage unit, the minimum integer satisfying such conditions that a sum of the amount of reduced electric energy of the electricity storage unit during a predetermined time period highest in operation frequency of the vehicles in the catenary-based transportation system and charged capacity accumulated in the electricity storage unit based on electricity regenerated during the predetermined time period is in excess of discharged capacity of the electricity storage unit in the case of a power-supplying contribution ratio γ of the other power supply system in a total discharged capacity of the integrated power supply equipment;

specifying a greater value obtained by comparing the first minimum parallel-array number with the second minimum parallel-array number as a first necessary parallel-array number of electricity storage devices which configure the electricity storage unit;

determining whether or not a cost value of power supply equipment which is composed of the cost of the other power supply system in the case of the power-supplying contribution ratio γ and the cost of the electricity storage unit which is configured by the first necessary parallel-array number of electricity storage devices is equal to or less than a previously-stored target cost value;

outputting the power-supplying contribution ratio γ and the first necessary parallel-array number as configuration conditions of the integrated power supply equipment in the case where the cost value of power supply equipment is equal to or less than the target cost value; and calculating the cost value of the power supply equipment is calculated by changing the power-supplying contribution ratio γ until the cost value of power supply equipment becomes equal to or less than the target cost value in the case where the cost value of power supply equipment is in excess of the target cost value.

4. The analysis method according to claim 3, wherein the catenary-based transportation system further comprises a storage power supply equipment which includes an electricity storage unit connected to a site different from a position at which the other power supply system is connected to a catenary, and, wherein the analysis method further comprises:

calculating a minimum integer greater than a proportion of maximum output electricity to allowable output electricity as a third minimum parallel-array number of electricity storage devices which configure the electricity storage unit of the storage power supply equipment based on the maximum output electricity output from the electricity storage unit of the storage power supply equipment and the allowable output electricity which is allowed by a single serial-array system of electricity storage devices which configure the electricity storage unit of the storage power supply equipment;

calculating a minimum integer as a fourth minimum parallel-array number of electricity storage devices which configure the electricity storage unit of the storage power supply equipment, the minimum integer satisfying such conditions that a sum of the amount of reduced electric energy of the electricity storage unit of the storage power supply equipment during a predetermined time period highest in operation frequency of the vehicles in the catenary-based transportation system and charged capacity accumulated in the electricity storage unit of the storage power supply equipment based on electricity regenerated during the predetermined time period is in excess of discharged capacity of the storage power supply equipment;

specifying a greater value obtained by comparing the third minimum parallel-array number with the fourth minimum parallel-array number as a second necessary parallel-array number of electricity storage devices which configure the electricity storage unit of the storage power supply equipment;

determining whether or not a total cost value of power supply equipment which is composed of the cost of the other power supply system in the case of the power-supplying contribution ratio γ, the cost of the electricity storage unit of the integrated power supply equipment which is configured by the first necessary parallel-array number of electricity storage devices, and the cost of the storage power supply equipment having the electricity storage unit configured by the second necessary parallel-array number of electricity storage devices is equal to or less than a previously-stored target cost value;

outputting the power-supplying contribution ratio γ and the first necessary parallel-array number as configuration conditions of the integrated power supply equipment and also the second necessary parallel-array number as configuration conditions of the storage power supply equipment in the case where the total cost value of power supply equipment is equal to or less than the target cost value; and calculating the total cost value of power supply equipment by changing the power-supplying contribution ratio γ until the total cost value of power supply equipment becomes equal to or less than the target cost value in the case where the total cost value of power supply equipment is in excess of the target cost value.

5. A recording medium storing a program for causing a computer of an analysis device of a catenary-based transportation system which is provided with integrated power supply equipment having an electricity storage unit which stores electricity regenerated by vehicles traveling by electricity received from a catenary and supplies electricity to the catenary and the other power supply system which is a power supply system different from the electricity storage unit, to perform as:

a first minimum parallel-array number-calculating unit which calculates a minimum integer greater than a proportion of a maximum input electricity to an allowable input electricity as a first minimum parallel-array number of the electricity storage devices which configure the electricity storage unit based on the maximum input electricity input to the electricity storage unit in the catenary-based transportation system and the allowable input electricity which is allowed by a single serial-array system of electricity storage devices which configure the electricity storage unit;

a second minimum parallel-array number-calculating unit which calculates a minimum integer as a second minimum parallel-array number of the electricity storage devices which configure the electricity storage unit, the minimum integer satisfying such conditions that a sum of the amount of reduced electric energy of the electricity storage unit during a predetermined time period highest in operation frequency of the vehicles in the catenary-based transportation system and charged capacity accumulated in the electricity storage unit based on electricity regenerated during the predetermined time period is in excess of discharged capacity of the electricity storage unit in the case of a power-supplying contribution ratio $\gamma$ of the other power supply system in a total discharged capacity of the integrated power supply equipment;

a unit for specifying the number of electricity storage devices arrayed in parallel which specifying a greater value obtained by comparing the first minimum parallel-array number with the second minimum parallel-array number as a first necessary parallel-array number of electricity storage devices which configure the electricity storage unit; and a power equipment configuration conditions specifying unit which determines whether or not a cost value of power supply equipment which is composed of the cost of the other power supply system in the case of the power-supplying contribution ratio $\gamma$ and the cost of the electricity storage unit configured by the first necessary parallel-array number of electricity storage devices is equal to or less than a previously-stored target cost value, the power equipment configuration conditions specifying means outputting the power-supplying contribution ratio $\gamma$ and the first necessary parallel-array number as configuration conditions of the integrated power supply equipment in the case where the cost value of power supply equipment is equal to or less than the target cost value, and the power equipment configuration conditions calculating the cost value of power supply equipment by changing the power-supplying contribution ratio $\gamma$ until the cost value of power supply equipment becomes equal to or less than the target cost value in the case where the cost value of power supply equipment is in excess of the target cost value.

6. The recording medium according to claim 5, storing the program for causing the computer of the analysis device of the catenary-based transportation system which further comprises a storage power supply equipment which includes an electricity storage unit connected to a site different from a position at which the other power supply system is connected to a catenary, to perform as:

a third minimum parallel-array number-calculating unit calculates a minimum integer greater than a proportion of maximum output electricity to allowable output electricity as a third minimum parallel-array number of electricity storage devices which configure the electricity storage unit of the storage power supply equipment based on the maximum output electricity output from the electricity storage unit of the storage power supply equipment and allowable output electricity which is allowed by a single serial-array system of electricity storage devices which configure the electricity storage unit of the storage power supply equipment; and a fourth minimum parallel-array number-calculating unit which calculates a minimum integer as a fourth minimum parallel-array number of electricity storage devices which configure the electricity storage unit of the storage power supply equipment, the minimum integer satisfying such conditions that a sum of the amount of reduced electric energy of the electricity storage unit of the storage power supply equipment during a predetermined time period highest in operation frequency of the vehicles in the catenary-based transportation system and charged capacity accumulated in the electricity storage unit of the storage power supply equipment based on electricity regenerated during the predetermined time period is in excess of discharged capacity of the storage power supply equipment, wherein the unit for specifying the number of electricity storage devices arrayed in parallel compares the third minimum parallel-array number with the fourth minimum parallel-array number and specifies a greater value as a second necessary parallel-array number of electricity storage devices which configure the electricity storage unit of the storage power supply equipment, the power equipment configuration conditions specifying unit determines whether or not a total cost value of power supply equipment which is composed of the cost of the other power supply system in the case of the power-supplying contribution ratio $\gamma$, the cost of the electricity storage unit of the integrated power supply equipment which is configured by the first necessary parallel-array number of electricity storage devices, and the cost of the storage power supply equipment having the electricity storage unit configured by the second necessary parallel-array number of electricity storage devices is equal to or less than a previously-stored target cost value, outputs the power-supplying contribution ratio $\gamma$ and the first necessary parallel-array number as configuration conditions of the integrated power supply equipment and also outputs the second necessary parallel-array number as configuration conditions of the storage power supply equipment in the case where the total cost value of power supply equipment is equal to or less than the target cost value, and the power equipment configuration conditions specifying unit calculates the total cost value of power supply equipment by changing the power-supplying contribution ratio $\gamma$ until the total cost value of power supply equipment becomes equal to or less than the target cost value in the case where the total cost value of power supply equipment is in excess of the target cost value.

* * * * *